United States Patent [19]

Comastri et al.

[11] 4,090,202

[45] May 16, 1978

[54] MULTIBAND ANTENNA FOR AUTOMOBILE WINDSHIELD

[75] Inventors: Mauro Comastri, Monza; Giorgio Ciarniello, Vasto (Chieti), both of Italy

[73] Assignee: Societa Italiana Vetro SIV S.p.A., Vasto (Chieti), Italy

[21] Appl. No.: 708,761

[22] Filed: Jul. 26, 1976

[30] Foreign Application Priority Data

Jul. 24, 1975 Italy .................................. 50648 A/75

[51] Int. Cl.² ............................................. H01Q 1/32
[52] U.S. Cl. .................................................. 343/713
[58] Field of Search ......................... 343/711, 712, 713

[56] References Cited

U.S. PATENT DOCUMENTS

| 3,771,159 | 11/1973 | Kawaguchi et al. | 343/713 |
|---|---|---|---|
| 3,845,489 | 10/1974 | Sauer et al. | 343/713 |
| 3,945,014 | 3/1976 | Kunert et al. | 343/713 |
| 3,971,030 | 7/1976 | Sauer | 343/713 |

*Primary Examiner*—Eli Lieberman

*Attorney, Agent, or Firm*—Browdy and Neimark

[57] ABSTRACT

A multi-band receiving antenna is supported on a windowpane for a radio-receiving set having a single antenna input socket. The antenna has a fishpole-type section which principally contributes to the reception of the metric wave band. A frame section, which runs parallel to the rim of the windowpane, principally contributes to the reception of the medium wave band. Each of the two sections contributes furthermore in a substantial measure, in the order of 10 – 20%, to the reception of signals having a frequency included in the band which is principally received by the other section. The impedance of the metric wave section is adapted by a spirally formed arrangement of the conductor or conductors of the frame portion of the antenna starting from the antenna terminal. The spiral forms an inductance of 0.2 – 0.5 μH over an area of 5 – 15 cm². The medium wave section includes a single conductor which runs in close proximity to the rim of the pane or two conductors which run in different directions along portions of the rim. When two conductors are used, the spiral is formed of a double wire.

4 Claims, 6 Drawing Figures

MULTIBAND ANTENNA FOR AUTOMOBILE WINDSHIELD

BACKGROUND OF THE INVENTION

The present invention refers to a radio-receiving multiband antenna supported on window panes, particularly for a windshield of motor vehicles. The term "window pane" is intended to mean in this connection a pane of glass or of plastic material and the antenna may consist of electric conductors deposited by the silk screen process on the pane, preferably on that face of the pane which, when fitted into the car, is the internal one; or else, if in lieu of tempered glass, two bonded together glass panes are used, applied to that face of the pane, which is in contact with the other face. Obviously, in lieu of conductors made by the silk screen process, also a conducting metal wire may be used.

Obviously, such antenna may be applied to any window of a motor vehicle, although the windshield is the most suitable place.

The antenna according to the present invention has been designed to receive radio-frequency signals in their various bands of transmissions, such as long waves, medium waves, short waves, metric or frequency modulation waves (FM) and VHF, decimetric waves and UHF and all the waves for sound and/or television information, included the frequencies reserved for radio amateurs.

The antenna incorporated in the pane, particularly in the windshield, is preferred to the conventional, freely supported motorcar antennas, because they are subjected to various drawbacks, such as:

(a) considerable vibrations during driving which render the signal fluctuating, particularly when receiving distant stations and the receiver operates in threshold conditions;

(b) marked instability in their characteristics, such as increase of their resistance and consequent increase in their losses, changes in the capacity of the antenna, due to its aging, to the possibility of water penetration in the cylindric bottom element, which causes corrosion and oxidation of the tubular elements in a polluting or brackish atmosphere;

(c) in the case of fishpole antennas, the fact that they strongly project beyond the motorcar contours, which leads often to their breaking, for instance when entering a garage, an underpass, etc., or damaging persons and goods if they are badly installed;

(d) furthermore the fishpole antenna is also subject to be willfully broken by vandals.

For all these reasons windshield antennas have been developped.

It is well known that the major part of radio-receiving sets for motor vehicles is provided with a single aerial socket, differently from the domestic receivers which have an input for the medium waves and one for the metric waves (FM), therefore a problem which must be faced in the aerials embedded in motorcar windshields is that of obtaining good reception of the medium waves as well as of the metric waves in a single antenna socket of the radio-receiving set.

In the prior art various shapes of antennas incorporated or embedded in windshields have been suggested, in an attempt to ensure a good reception in all wave bands. For this purpose antennas have been devised having one central vertical fishpole-type straight or T-shaped element, which afford a good reception particularly in the field of metric waves, and have also been devised antenna elements of greater length which run along the rim of the glass pane, forming so-called "rim" conductors, which afford a good reception in the field of medium waves. However, the problem in these types of antennas with the distinct receiving elements in the various frequency bands is that the signals received by the individual elements conjoin correspondingly to the single input of the radio receiver, and thus it is difficult to obtain a good reception throughout all wave bands, since an antenna built for instance to give a good reception in medium waves is generally not fitted with the characteristics which may confer to it a good yield also in the reception of metric waves and vice versa. In the prior art there have been suggested types of antennas which were supported on the windshield of a motor vehicle, wherein that part of the antenna which was suitable for a certain frequency band, form an undesirable load when the antenna must operate for a different frequency band and furthermore, in particular in the reception of metric waves, these types of known antennas have a very variable efficiency in the various directions of reception.

SUMMARY OF THE INVENTION

According to the present invention, it has been found that some antenna structures are capable of receiving with an optimum efficiency both the signals in the range of the medium waves (550–1600 KHz) and those in the frequency modulation range (87.5–108 MHz). In fact, the electric characteristics of the windshield antenna according to the present invention excellently satisfy those which are required by the greater part of the radio-receiving sets presently marketed, which require a very high antenna capacity of 70–100 pF (a capacity value which, added to the capacity of the coaxial cable and of the connector permits, by means of the trimmer provided in the receiver, to obtain the best possible tuning between the antenna and the receiver at a capacity around 150 pF) with a high resistance to losses (some hundreds of kohm) in the medium waves band and an antenna impedance of approximately 150 ohm which is prevalently resistive and with a phase contained within $\pm 30°$ within the band of metric waves.

In order to obtain a good reception, the ideal would be to have the length of the antenna conductors equal to a well defined fraction of the wave length $\lambda/2 - \lambda/4$ according to whether the antenna is of the symmetric or assymmetric type.

Since it is impossible, at least for the medium waves, to have wires of the length equal to $\lambda/4$ (187/4 – 570/4 meters) owing to the natural limitations inherent to the windows of a motor vehicle, an antenna has been designed which, although in its reduced development, insures an excellent efficiency of reception both in the medium wave band and in the frequency modulation band.

This has been rendered possible, according to the invention, by adapting the antenna in such a manner that its section prevalently contributes to the reception of the signal in a given frequency band and another section contributes prevalently to the reception of the signal of another frequency band, but each section contributes also to the section of the signal having a frequency included in the band which is that prevalently received by the other section. In such a manner, in lieu of having two antenna sections, each of which becomes active in the reception of a certain frequency band, while the other section is devoid of any utility or even a source of parasite load as it happens in the prior art — in the antenna according to the invention both sections give an active contribution to the reception of the signal, and therefore this antenna is actually a true and real multi-band antenna which functions in an optimum manner for the most diverse frequency bands and in addition to it with respect to the known technique, it presents a convenient and regular efficiency of reception in all possible directions.

This result has been obtained by an antenna having a geometry such as to satisfy extremely exacting requirements with regard to the impedance of the antenna circuit, by conferring a given configuration to the conductors of the antenna and positioning them with respect to the rims of the windshield in such a manner as to obtain, in the reception of the metric waves, a practically real magnitude of said impedance, approaching the optimum of 150 ohm. For this purpose the prevalently active portion of the antenna consists of a fishpole-type conductor running preferably along the vertical center line of the pane, which conductor, in order to maintain the impedance value which is characteristic of the considered frequency band terminates, in one embodiment of the invention, in a spiral which yields an inductance of a magnitude between 0.2 – 0.5 $\mu$H around its signal output terminal. This arrangement has the advantage of permitting the compensation of the reactive component of the impedance of the fishpole portion of the antenna in a wide range of the desired frequencies.

The overall impedance of the antenna, while it has been adapted in such a manner, will vary in the frequency range from 87.5 – 110 MHz between 100 and 200 ohm and transfer in this manner the maximum input to the car radio which requires an optimum impedance of 150 ohm.

The term "adapted" is intended to mean that, during reception, the contribution of the receiving element is prevalent, whereas the remaining portion of the antenna gives a contribution of the order 10 – 20% which adds to the other element; in FM the prevalent receiving element is the central fishpole antenna, while in the medium waves the receiving element is the remaining portion of the antenna which runs along the rim of the glass pane, spaced a few centimeters therefrom; the optimum distance from the rim depends on the dimension of the glass pane.

It has been found that the length of the fishpole portion of the antenna essentially depends from the size of the glass pane, but having regard to the condition that its length must be a well defined fraction of the wave length, for instance $\lambda/4$.

Such length of the fishpole may also vary according to whether it consists of a silver deposit applied by the well-known silk screen process to the glass, or whether it is a very thin wire, such as a wire of 1-2 tenths of a millimeter placed on a plastic sheet and sandwiched between two glass panes in order to form a safety glass. In fact the speed of propagation of electromagnetic waves is different according to whether reception occurs on the external surface of the glass or in the interface between two glasses. The correct length of the conductor is computed, for each single case, on the basis of these data, in order to obtain the resonance to the desired frequencies, so as to have, in the reception of the metric waves, a prevalently resistive antenna impedance around 150 ohm and therefore a maximum transfer of the signal fed into the receiver.

For an antenna portion which is mainly intended for the medium waves, a shape and a structure have been found which are capable of insuring the maximum possible capacity (of approximately 100 picofarad) and a high loss resistance.

It has been found that the spacing of the conductors from the rim of the glass pane is dependent on the capacity necessary to minimize the partition of the signal received by the antenna and transferred to the receiver and is a function of the geometric dimensions of the windshield, and that the efficiency of the antenna improves when its conductors are farther away from the glass pane rim. Therefore, when dimensioning the configuration of the antenna, it is convenient to obtain a correct compromise between a good value of antenna capacity and a good receiving efficiency. It has also been found that when receiving medium waves with the antenna configuration according to the invention, the antenna presents a good capacity when the conductor is spaced approximately 7 cm. from the rim; to further increase the capacity, the conductor which runs along the rim may be lengthened by reversing its direction and leading it parallel to the preceding one. When the size of the windshield permits it and it can be done without interfering with its area of visibility, it has been found that it is advantageous to increase said distance of the conductor from the glass rim to approximately 9 – 10 cm. The invention will be better illustrated from the following description, made with reference to the drawings, of some forms of its embodiment.

BRIEF DESCRIPTION OF THE DRAWINGS

FIG. 1b shows an enlarged detail of it;
FIG. 2b shows an enlarged detail of it;
FIG. 1c shows a variant of FIG. 1a;
FIG. 2c shows a variant of FIG. 2.

DESCRIPTION OF THE PREFERRED EMBODIMENTS

Figure 1:
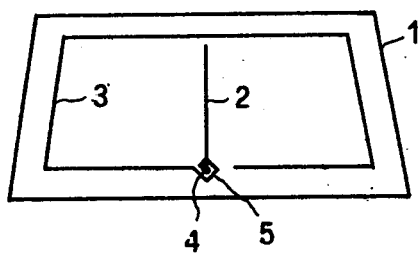
FIG. 1 shows a first embodiment of the invention.
Figure 1:
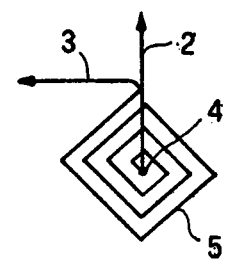
Figure 2:
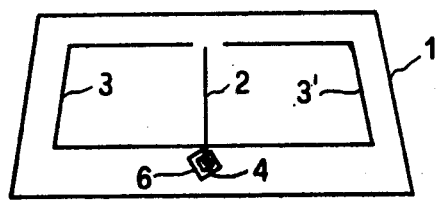
FIG. 2 shows a second embodiment of the invention.
Figure 2:
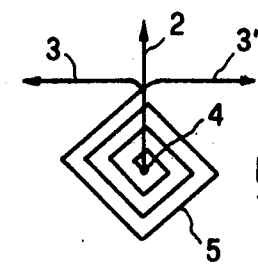
Figure 1:
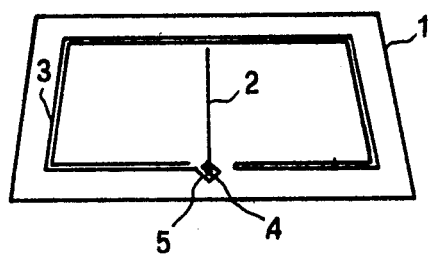
Figure 2:
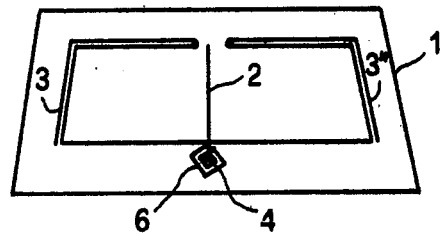

With reference to the figures, in general the antenna according to the invention, supported on a windshield 1 consists of a "fishpole-type" conductor indicated at 2 in all figures, and of an element which runs along the rim of the glass pane, said element consisting of a single conductor indicated at 3 in all figures, or comprising a second conductor indicated at 3' in FIGS. 1c and 2c.

All conductors join in a terminal connected to the receiver.

In the embodiment shown in FIGS. 1a, 1b, 1c, as well as 2a, 2b and 2c, the adaptation of the antenna impedance is obtained by means of a reactance made of a flat spiral having normally from three to five spires, which may be either circular or rhomboidal and originating in the terminal 4 and having an area between 5 and 15 cm$^2$.

In FIGS. 1a, 1b and 1c, wherein the antenna portion running along the glass rim is formed by a single conductor 3, the coil 5 consists of a single wire which, after forming three spires, starting from terminal 4, continues forming the aforesaid conductor 3 which follows the glass pane contour at a distance of approximately 7 cm. therefrom and ends at a few centimeters, preferably 2 cm., from the opposite side of the spiral. FIG. 1b is, as stated, an enlarged view of the spiral 5. In the variant of FIG. 1c, with respect to FIG. 1a, the wire 3 of the conductor, in lieu of ending, turns back and follows, as indicated at 3', the path of conductor 3 in the reverse direction.

In FIGS. 2a, 2b and 2c the wire 3, which we shall term "frame portion" of the antenna, consists of two conductors 3 and 3" and the spiral 6 is made of a double wire, which, as better shown in the enlarged FIG. 2b, branches into opposite directions in order to form the frame portion 3 and 3". Also the fishpole portion of the antenna extends from the terminal 4. FIG. 2c is a variant of FIG. 2a, wherein the conductors of the frame portion 3 and 3" have been doubled back along a path parallel that oppositely directed to that of conductors 3 and 3".

The antenna configurations shown in FIGS. 1a, 1b, 1c and 2a, 2b and 2c are particularly advantageous when made with a conductor wire incorporated or embedded in the windshield, especially with an insulated wire. In fact, an antenna of this type cannot be made by means of the silk screen process.

EXAMPLE

An antenna of the type illustrated in FIGS. 1a and 1b, incorporated into a windshield of the size 60 × 130 cm. has been subjected to a test and has shown to present the following characteristics:

antenna capacity 65 – 70 pF in medium waves
loss resistance 300 kohm in the medium wave range
antenna impedance 120 – 200 ohm in FM.

When the antenna according to the invention has doubled back extensions, it is understood that these extensions may run along the internal or the external side of the frame portion.

The above indicated results show that the invention has provided an efficient multi-band antenna with excellent operating and directional characteristics.

It is clear that the invention is not limited to the here illustrated embodiments, but encompasses all variants thereof.

We claim:

1. In a multi-band receiving antenna supported on a windowpane having a rim and suitable for a radio-receiving set having a single antenna input terminal, which antenna includes a fishpole-type section which prevalently contributes to reception of the metric wave band and which is connected to the terminal and a frame section which runs parallel to the rim of the windowpane and prevalently contributes to reception of the medium wave band, the improvement wherein said frame section consists of a single conductor having a free end and running along parallel to and in close vicinity from said rim, and means for adapting the impedance of the metric wave section comprising a spirally formed conductive extension of said single conductor of said frame section of the antenna connected between said terminal and said single conductor, such as to form an inductance of from substantially 0.2 to substantially $0.5\mu H$ over an area of from substantially 5 to substantially 15 $cm^2$, said free end of said single conductor terminating in the vicinity of said spirally formed extension, whereby each of the sections contributes in substantial measure, in the order of 10 to 20%, to reception of signals having frequencies included in that band which is prevalently received by the other section.

2. An improved multi-band antenna according to claim 1, wherein said single conductor running along in parallel to said rim of said windowpane includes a first portion and a second portion, said second portion consisting of a portion of said single conductor running in parallel to and in close vicinity from said first portion.

3. An improved antenna according to claim 2, wherein the conductor forming said frame section of the antenna is spaced from approximately 7 to approximately 10 cm from said rim of said windowpane.

4. An improved antenna according to claim 1, wherein the conductor forming said frame section of the antenna is spaced from approximately 7 to approximately 10 cm from said rim of said windowpane.

* * * * *